June 22, 1948. H. G. TERBEEK 2,443,809
TWO-DIRECTION FLOW EQUALIZER
Filed March 18, 1943 4 Sheets-Sheet 1
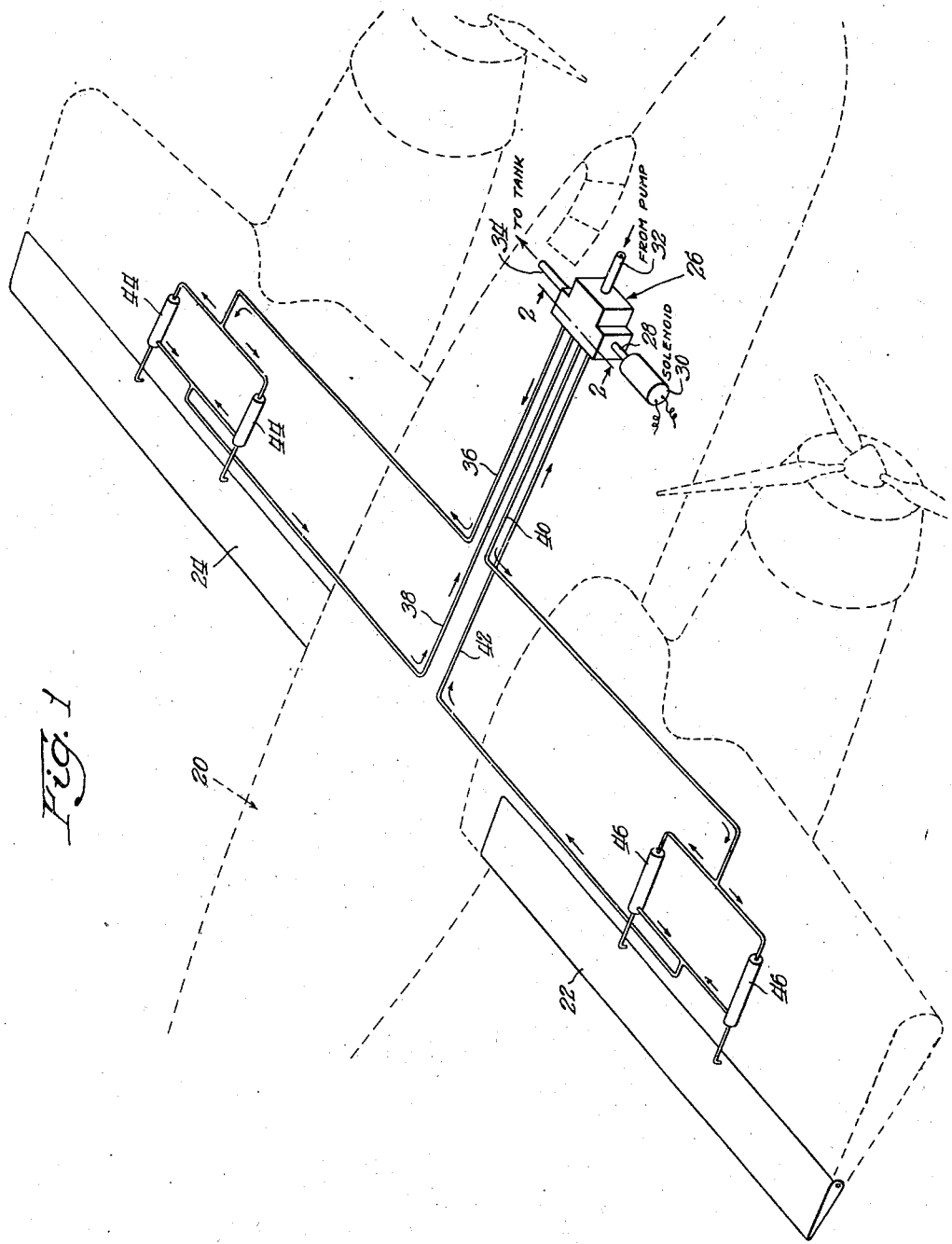
Inventor:
Howard G. Terbeek
By: Edward C. Fitzbaugh
Atty.

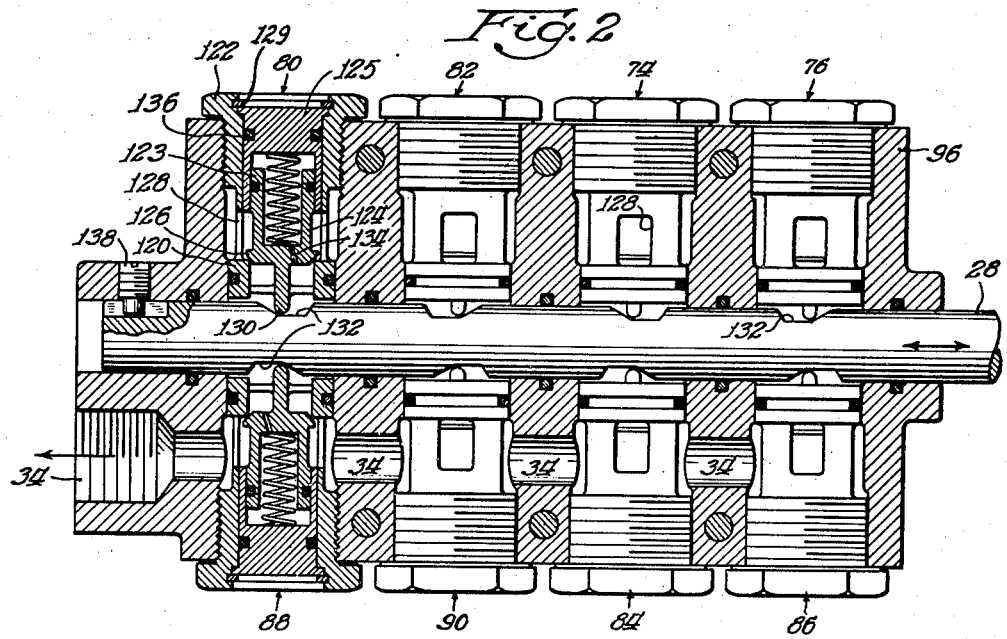
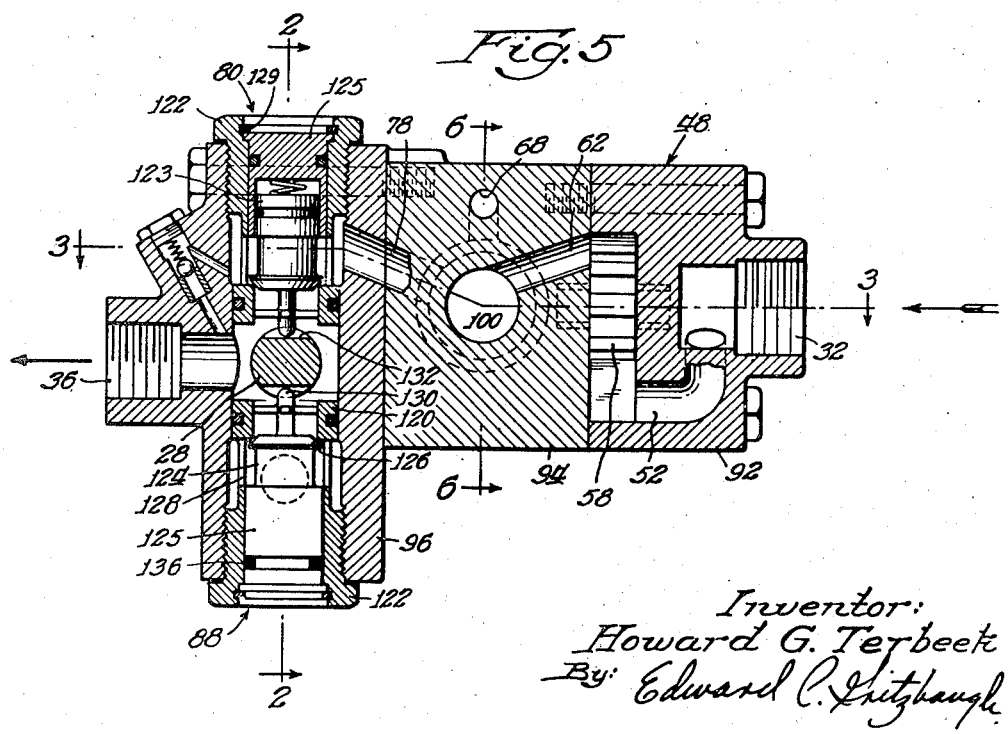

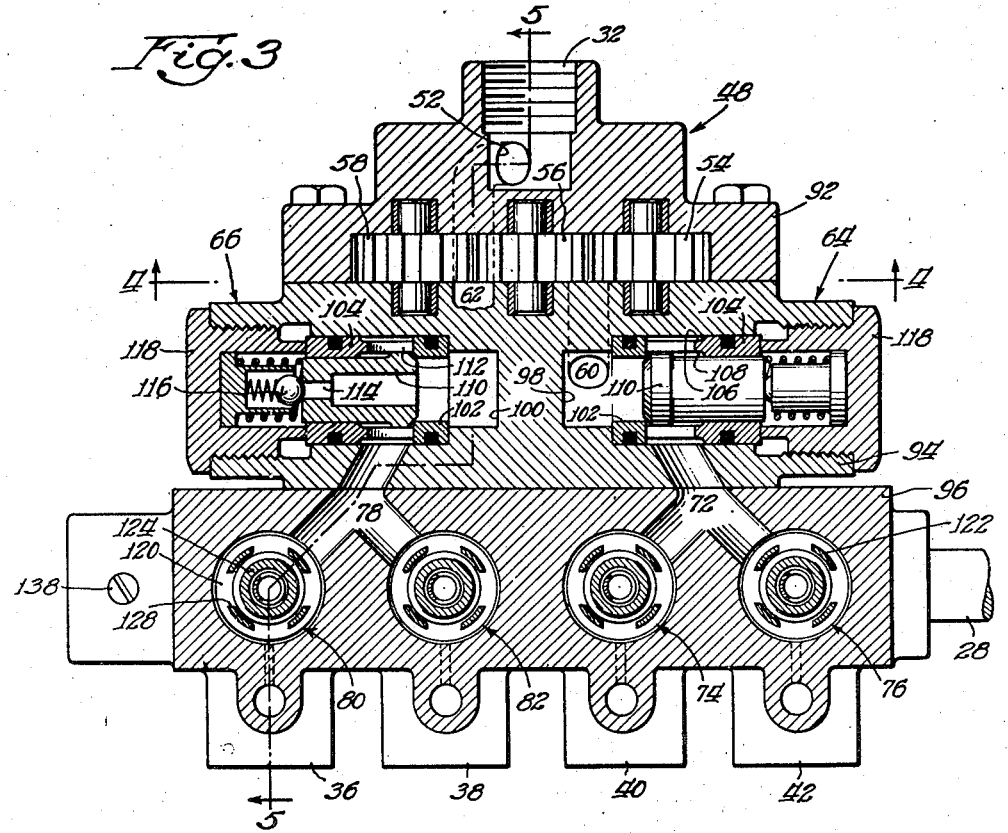
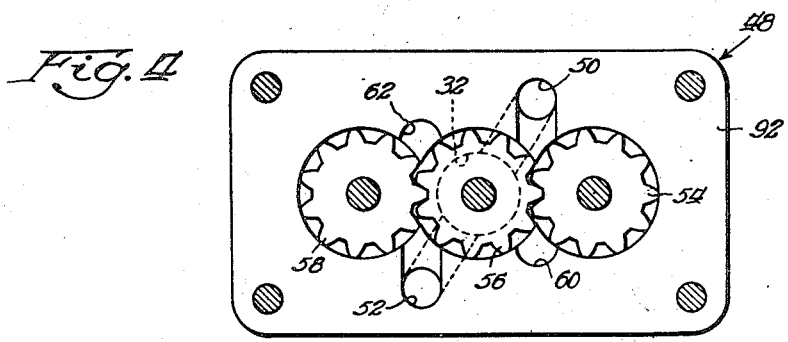

June 22, 1948. H. G. TERBEEK 2,443,809
TWO-DIRECTION FLOW EQUALIZER
Filed March 18, 1943 4 Sheets-Sheet 4
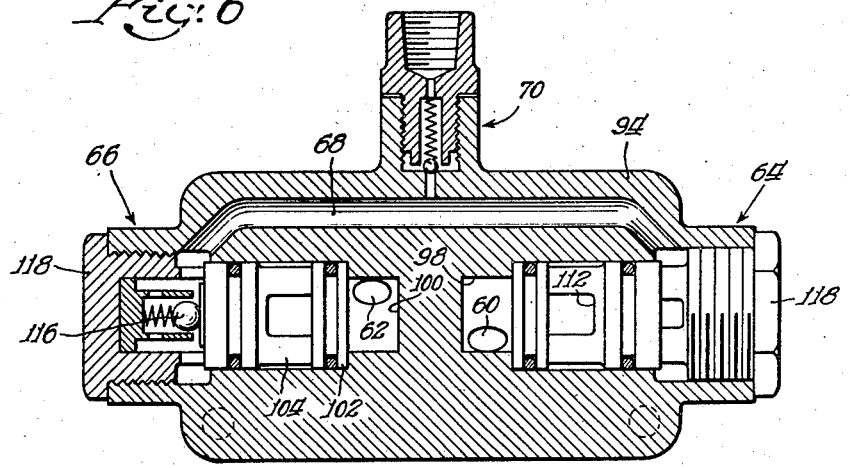
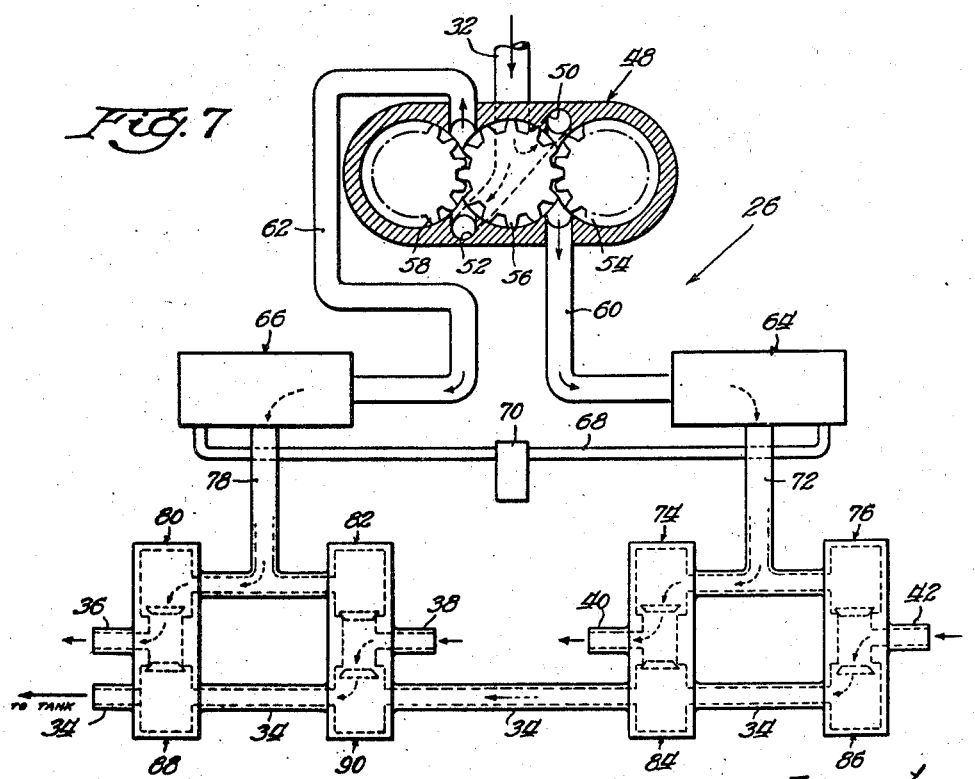
Inventor:
Howard G. Terbeek
By: Edward C. Fitzhugh
Atty Patented June 22, 1948

2,443,809

UNITED STATES PATENT OFFICE 2,443,809

TWO-DIRECTION FLOW EQUALIZER

Howard G. Terbeek, Cleveland, Ohio, assignor, by mesne assignments to Borg-Warner Corporation, Chicago, Ill., a corporation of Illinois Application March 18, 1943, Serial No. 479,634

4 Claims. (Cl. 60—97)

This invention relates to multiple direction flow equalizer and valve means for synchronous operation of a plurality of remotely located independent devices. More specifically, it is an object to disclose a compact valve and equalizer arrangement for an hydraulic system, for controlling the flow in both directions to two or more devices such as two independent fluid motors of the piston type, which are used to operate independent devices which must be synchronized, such as the wing flaps or landing gear of an airplane. In this connection, it is an object to provide an arrangement which will control the flow in both directions so that the devices are synchronized in operation both on the outward movement and the return movement.

Heretofore it has been proposed to synchronize the movement of wing flaps on a transport plane for example in the down movement such as the movement when the plane is landing, but it has generally been unnecessary to synchronize on the reverse movement or the return to normal flying position. In such event, the flow has been carefully metered in the hydraulic lines for forcing the wing flaps downward in synchronism, but has been allowed to return without any particular metering or checking operation so that these wing flaps do not always return to normal in the synchronized relationship. In the case of a dive bomber for example, it is necessary to control the wing flaps in both directions and this has been done, heretofore, by having a plurality of separate flow equalizers. This has resulted in extra expense, added weight, and the loss of very valuable space to the installation of equipment.

It is an object of this invention to provide a compact unit in which the flow equalizer operates in one direction, but in which the equalized flow is metered and directed by valves selectively to either of the ends of the piston motors, which arrangement results in the pump operating in one direction only and in the return flow being by-passed to the tank without the necessity of reversing the pump. Further, such an arrangement, because of the fact that the equalizer and valves are in the same housing, is very compact and comparatively light, and results in a saving in weight and space which is highly desirable. In this connection, some of the joints or conduits are eliminated, and a unitary assembly is provided which is much easier to install than the plurality of devices heretofore used.

It is a further object to provide a valve arrangement which is operable by a hand lever or which may be operated by a solenoid or other means, or both. Further, in this connection, it is an object to disclose a novel means of actuating the control valves whereby they are operated in the proper sequence and without danger of operating the valves out of order.

It is also an object to provide an improved article of manufacture and a construction which is comparatively simple, is relatively inexpensive, may be quickly and easily serviced and which is rugged and compact.

These and other objects and features of this invention will become apparent from the following specification when taken together with the accompanying drawings in which:

Fig. 1 is a schematic diagram showing the application of the present invention to the operation of the wing flap of an airplane of conventional design;

Fig. 2 is a longitudinal sectional view taken on the line 2—2 of Fig. 1 and on the line 2—2 of Fig. 5 looking in the direction of the arrow;

Fig. 3 is a sectional view taken on the line 3—3 of Fig. 5, looking downward on the device and in the direction of the arrows as indicated in Fig. 5;

Fig. 4 is an elevational view taken on the line 4—4 of Fig. 3 looking in the direction of the arrows;

Fig. 5 is a view taken on the line 5—5 of Fig. 3 looking in the direction of the arrows;

Fig. 6 is a view taken on the line 6—6 of Fig. 5 looking in the direction of the arrow; and Fig. 7 is a view showing schematically the relative operating arrangement of the parts comprising the device of Figs. 2, 3, 4, 5 and 6.

Referring more in detail to the construction shown in the various figures, and referring first to the schematic view of Fig. 1, there is illustrated the application of an hydraulic system embodying the features of the present invention to an airplane of conventional design for operating the wing flaps thereof. The airplane 20 is shown in dotted lines and it is shown as having the conventional wing flaps 22 and 24, illustrated in heavy lines.

The airplane 20 is illustrated schematically as provided with the two-directional flow equalizer and valve assembly illustrated in its entirety at 26, having a cam shaft 28 to be described more in detail hereinafter. The cam shaft 28 may be manipulated by means of the solenoid 30, or by any other convenient means such as by a hand operated lever.

The two-directional equalizer and valve assembly 26 has an inlet conduit 32, which preferably supplies fluid under pressure from a pump or accumulator.

The member 26 also has the outlet conduit 34, ordinarily leading to a tank or the like for the storage of fluid, or it being the usual practice for the fluid eventually to find its way back through the inlet 32.

The member 26 is likewise provided with the two-way conduits 36, 38, 40 and 42. The conduits 36 and 38 connect to a device to be hydraulically operated such as the opposite sides of the fluid motors 44. The conduits 40 and 42 in a like manner connect to the fluid motors 46. The fluid motors 44 and the fluid motors 46 are preferably of the so-called piston type, and are mechanically connected to the devices to be controlled such as the wing flaps 24 and 22 respectively whereby movement of the pistons in the fluid motors manipulate the wing flaps in a direction to raise or lower them as the case may be.

The fluid motors 44 are preferably connected in parallel on one side to the conduit 36, and are connected in parallel on the other side to the conduit 38. The fluid motors 46 are connected in parallel on one side to the conduit 40, and are connected in parallel on the other side to the conduit 42. Since the fluid motors 44 are mechanically connected to the same device, that is the wing flap 24, they must of necessity operate in synchronism. The same holds true for the fluid motors 46 which are connected to the wing flap 22. It is important that the motors 44 be hydraulically operated in synchronism with the motors 46, and the fluid in the conduits 36, 38, 40 and 42 must be equalized for this purpose.

Referring next to the construction shown in Figs. 2, 3, 4, 5, 6 and 7, and referring first to Fig. 7 (and Fig. 4 to a lesser extent) in order to get a clear understanding of the arrangement of elements and fluid circuits of the device 26, the inlet 32 discharges fluid into a gear type divider 48 which preferably has two inlet ports 50 and 52 conducting fluid into the divider gears 54, 56 and 58 in the well-known manner. The fluid thus discharged into the inlet sides of the gears from the inlet 32, is carried by the gears to the discharge outlets 60 and 62. The amount of fluid pumped into each discharge outlet is dependent somewhat on the reverse pressure exerted on the fluid in the outlet. Since it is essential that the fluid flow in each outlet be the same regardless of the reverse pressure, throttling valves 64 and 66 are connected respectively to the outlets 60 and 62. Details of these throttling valves will be disclosed later herein, but an interconnecting conduit 68 connects these throttling valves 64 and 66 hydraulically in such a way that the pressure in one throttling valve is reflected on and affects the operation of the other throttling valve. A thermal relief valve 70 may be provided, and preferably it is located in the interconnecting conduit 68, so that the expansion of fluid in the system due to changes in temperature will not cause a dangerous bursting pressure in the system, but will be relieved by minute quantities of the fluid passing out through the thermal relief valve. If desired this relief valve may be connected to the storage tank.

The throttling valve 64 has an "outlet T-conduit" 72, which branches with leads to the cam operated valves 74 and 76 for the two-way conduits 40 and 42 respectively. These valves 74 and 76 operate in an alternate manner and are controlled by means such as the cam shaft 28.

The throttling valve 66 is likewise provided with a similar arrangement comprising the "outlet T-conduit" 78, which branches with leads into the valves 80 and 82 for the respective conduits 36 and 38. These valves 80 and 82 likewise are operated by the cam shaft 28 so that they are opened and closed alternatively. With this arrangement, and as will be more clearly apparent from a detailed description of the other figures, when the valves 74 and 80 are open, and they are in synchronism, the valves 76 and 82 will be closed. As the valves 76 and 82 are opened, the valves 74 and 80 will be closed. In this way, the fluid from the respective throttling valves is directed through a selected valve and thus into the desired two-way conduit, fluid being directed simultaneously into conduits 36 and 40 or alternatively into conduits 38 and 42, as the case may be.

Preferably located on the opposite side of the cam shaft 28 from the valves 74, 76, 80 and 82 are the valves which may be denoted the reverse valves 84, 86, 88 and 90 respectively. When one of these valves is opened, fluid in the two-way conduit connected to the valve returns through the valve to the tank. The valves 86 and 90 open simultaneously and close simultaneously, and the valves 84 and 88 likewise open and close simultaneously, the latter two valves being open when the former two are closed and vice versa. Further, these valves 84, 86, 88 and 90 are synchronized by the cam shaft 28 to the operation of the valves 74, 76, 80 and 82 respectively. When the valves 74 and 80 are open, the valves 84 and 86 are closed. When this occurs, fluid from the throttling valves 64 and 66 flows through the respective T-conduits 72 and 78 into the valves 74 and 80, past these valves and into the outlets to the two-way conduits 40 and 36 respectively. While this is happening, the fluid in the conduits 42 and 38 flows back through the respective reverse valves 86 and 90 which are open, into the outlet conduit 34 leading to the tank. In this operation just above described, the wing flaps 22 and 24 will be forced downward by the flow of fluid through the two-way conduits 36 and 40 into the piston motors 44 and 46. To reverse the operation, the cam shaft is manipulated to close the valves 80 and 74, as well as the valves 86 and 90, and open the valves 76, 82, 84 and 88. The fluid in the whole system is thus reversed, that is the fluid in the system between the wing flaps and the throttling valves 64 and 66, and the wing flaps 22 and 24 will be raised under equalized pressure so that they operate in entire synchronism.

Now that the above schematic picture of the operation has been described, reference is next made to the detailed construction of the various devices used in the system. It is noted that all of the elements described in Fig. 7 except for the conduits 32, 34, 36, 38, 40 and 42 are entirely embodied in a single compact housing. This is best illustrated by reference to Figs. 2, 3 and 5, wherein details of the assembly are made clear. A preferred construction for the unit 26 is to have the housing divided into three principal sections 92, 94 and 96, which are fastened together by any convenient means such as bolts or the like. This is for convenience in manufacture and assembly. The section 92 together with a portion of the section 94, is recessed or bored in an overlapping manner on the inner surface to accommodate the meshing gear wheels 54, 56 and 58 above mentioned. These gear wheels are journaled to rotate in the well known manner of gear dividers of this type. Fluid, preferably under pressure from an accumulator or pump, is introduced into the inlet side of the gear wheel 54 and 56 and carried by said gear wheel to the outlet conduit 60 and 62. This above-mentioned fluid is taken by the gears from the inlet port 50. Fluid introduced from the inlet conduit 32 to the inlet port 52 will be carried in two directions as was the case with the gear wheel 54 and 56, and discharged into the discharge outlets 60 and 62. The throttling valves 64 and 66 are substantially identical in construction, and the description of one will adequately describe the other. For compactness, they are preferably located on the same axis, as is clear from Figs. 3 and 6. The housing section 94 is, for this purpose, provided with a pair of bores, those disclosed being from opposite sides of the housing.

These bores in their inner ends are of reduced circumference to form the valve inlet chamber 98 and 100 for the valves 64 and 66 respectively. The discharge outlets 60 and 62 discharge into the throttling valves 64 and 66 respectively, the discharge being into the chambers 98 and 100 respectively.

Chamber 98 is provided with an annular ring forming a valve seat 102, and the valve chamber 100 is provided with a similar member. This member 102 in each valve seats on a shelf or flange created by the enlargement of the housing bore. Likewise seated in the bore, is the cylindrical bushing 104, which is preferably in the form of an insert and seats against the material of the valve seat 102. This member 104 has a pair of aligned annular grooves 106 and 108, forming channels inside and outside of said bushing, the channel 106 being between said bushing and said cylinder wall, and the groove 108 forming a channel within the bushing 104. The channel 108 is in reality the space in which the head of the tubular valve 110 seats and moves, said bushing 104 having the ports 112 whereby fluid from the chambers 98 and 100 may reach the channel 106. This channel 106, in both valves, communicates with the respective outlet T-conduits 72 and 78. Fluid, when not interfered with or prevented by the head of the tubular valve 100, passes into said channel 106 from where it is withdrawn by the outlet T-conduits 72 and 78 respectively. The tubular valve 110 is preferably provided with a restricted port 114, which forms the seat for a ball valve 116.

Each of the actual bores formed in the housing section 94, is preferably closed at its outer end by means of the hollow cap 118. This cap 118 has an axially extending skirt portion, into which the spring which guides and seats the ball valve 116 is placed. As is particularly apparent from Fig. 6, the plug or hollow cap 118 forms, with an enlargement of the bore of said section 94, an annulus or channel, connected with the annulus or channel similarly formed in the other throttling valve, by means of the inter-connecting conduit 68. With this arrangement, when fluid back pressure in the outlet T-conduit 72 for example builds up, this pressure will be reflected through the tubular valve 110, displacing the ball 116 and being reflected in the inter-communicating channel 68. In the other valve, the pressure in the space between the ball and the hollow cap will be increased and the ball will be pressed against the seat formed by the tubular valve 110, tending to move the tubular valve into a seated position on the valve seat 102. As a result, the flow past the head of the tubular valve 110 will be restricted until the amount is equal to the restricted flow due to the back pressure in the outlet T-conduit 72, by which arrangement the flow in both T-conduits 72 and 78 is identical. Should the pressure build up in the conduit 78, the process will be reversed.

Referring next to the details of construction disclosed in Fig. 2 in particular, and to considerable detail in Figs. 3 and 5, the valves 74, 76, 80, 82, 88, 84, 90, and 86 may be of substantially identical construction, and for the purposes of this application, a detailed description of one of the valves and a showing of the relationship of two opposed valves such as 80 and 88 as in Figs. 2 and 5, are believed to constitute a sufficient disclosure for understanding the whole.

These above-mentioned valves are located in the housing section 96, the housing being for that purpose provided with four vertical bores aligned transversely of the housing 96.

Each of these valves comprises, as illustrated in Figs. 2 and 5, in connection with the valves 80 and 88, an annular valve seat located in the bore, the valve seat here being referred to as seat 120 for all valves. A hollow plug 122 of which seat 120 is a part is threaded into said bore from one end. This plug 122 is preferably cylindrical in shape, and its internal bore forms a seat for a hollow valve member 123, said valve member 123 being in turn constructed of the skirted end portion 124 and the movable hollow valve head 126. Said valve head has a skirt extending into, and axially movable within, said skirt of the member 125. The head 126 removably seats on the valve seat 120 and forms a seal therewith. The hollow plug 122 is preferably formed with a reduced diameter near its inner end, whereby an annulus is created for the transfer of fluid. Port or ports 128 communicate with said annulus and with the space about said valve head. The valve head 126 preferably has spring means seated within the cup formed by the skirt and by the skirt of said member 125, urging said valve head outwardly. Said valve head likewise is provided with an axially extending stem portion 130, adapted to contact the cam surface 132 on the cam shaft 28. This valve head 126 may be provided with a port 134 to prevent entrapment of substantial amounts of fluid between said valve head and said member 125 within the tubular portion formed by the skirt thereof.

Said member 125 is preferably insertable and removable from the plug 122 in the manner shown, it being held in position by a fitted snap ring 129. In this manner, manufacture and service of these valves is more easily accomplished, and it is not necessary to disturb the alignment thereof to remove or replace damaged or broken parts. This valve as well as other valves in the system, are provided with the necessary annular sealing rings such as the sealing rings 136, to prevent undesirable leakage of fluid. This is a well-known expediency.

All of said valves have a similar construction. The cam shaft 28 extends transversely through the housing section 96 in a manner best illustrated in Figs. 2 and 3. This cam shaft is preferably located between the valves 74, 76, 80, 84, 88, 86 and 90 in the manner shown. Adjacent to each valve, said cam shaft is provided with a cam surface 132, which surfaces are preferably of substantially the same shape but differently arranged for the groups of valves. Cam surfaces for the valves 80 and 74 are the same, valves 76 and 82 are the same, all located on one side of the cam shaft. On the opposite side of the cam shaft are the cam spaces for valves 88 and 84 (which are substantially the same) and valves 86 and 90 which are the same. The cam surfaces of cam shaft 28 for valves 80 and 88, for example, are such that with the stems 130 for both valves, in the position shown in Fig. 2, the valves will remain closed. Movement of the cam shaft 28 to the right would open valve 80 to the flow of fluid between the valve head 126 and the valve seat 120, said fluid being from the throttling valve to wing flap motors. This same movement would also open valve 74, and the valves 84 and 88 would remain closed; and as will be apparent from Fig. 2, the same movement would also leave valves 82 and 84 closed but would open valves 86 and 90.

Movement of the cam shaft 28 to the extreme in the other direction, would reverse the process and close those valves which were opened in the above-mentioned arrangement and open those valves which were closed in the above-mentioned arrangement.

The set screw 138 prevents rotation of the cam shaft as is apparent from the drawings.

In operation it will thus be seen that movement of the cam shaft 28 to the right hand as shown in Fig. 2, would create the circulation of fluid in the manner shown in Figs. 1 and 7 by the arrows. This would cause the wing flaps to lower. Movement of the cam shaft 28 back to the neutral position of Fig. 2 would lock the wing flaps in the lowered position holding the fluid in the system static. Movement of the cam shaft 28 all of the way to the left as will be apparent from Fig. 2, would reverse the flow of fluid and raise the wing flaps under a controlled arrangement. Upon the wing flaps being raised the cam shaft could again be moved to the neutral position whereupon the fluid will be locked in the system and the system become static.

It will thus be seen there is provided a novel and efficient manner of controlling the wing flaps of an airplane and other such devices for airplanes or other industrial uses. The application of the device to the wing flaps of an airplane is primarily for illustrative purposes, but such application has many particular advantages over prior methods of controlling wing flaps of airplanes.

While I have disclosed my invention in connection with certain specific embodiments thereof, it is to be understood that these are by way of example rather than limitation, and it is intended that the invention be defined by the appended claims.

I claim:

1. In a device of the class described, means for operating a plurality of remotely located devices, such as wing flaps of an airplane, to be operated in synchronism, said means comprising a source of fluid under pressure, a plurality of fluid motors operating said devices under fluid pressure, and a unitary assembly adapted for dividing, equalizing and diverting said fluid under pressure selectively into a plurality of predetermined conduits and reverse conduits whereby said motors are operated under controlled pressure throughout movement in both directions, said unitary assembly comprising an encompassing housing having a plurality of ports communicating with said conduits and reverse conduits and a port for receiving fluid under pressure from said source, a gear type divider in said housing having fluid communication with the housing port receiving said fluid under pressure, separate discharge means in said housing leading from said divider for streams divided from said fluid under pressure, means comprising a throttling valve regulating the amount of fluid in each discharge above mentioned, valve means selectively directing substantially proportional streams of said fluid under pressure alternately into said plurality of conduits and said plurality of reverse conduits, as the case may be, means comprising a longitudinally reciprocal cam shaft operating said valve means, a set of release valve means coordinated with said above-mentioned valve means and operable by said cam shaft for releasing fluid from said conduits when said first-mentioned valve means directs fluid into said reverse conduits and releasing fluid from said reverse conduits when said first-mentioned valve means directs fluid into said conduits, said last-mentioned valve means being operable from said cam shaft in controlled relation to said first-mentioned valve means, and means reciprocating said cam shaft whereby said valves are actuated.

2. In combination with actuating means for operating a pair of movable members, which operating means includes a pair of piston type fluid motors each operatively connected to a member, and a plurality of fluid conduits and reverse conduits to and from said fluid motors; those improvements which embody a unitary assembly adapted to effect operation and control of said motors to move said members in synchronism, said unitary assembly comprising means defining an encompassing housing having ports respectively communicating with said fluid conduits and reverse conduits and also with a source of fluid under pressure, a gear divider in said housing, a plurality of throttling valves in said housing, a plurality of direction regulating valves between each throttling valve and the ports which communicate with said fluid conduits, a plurality of reverse valves between each throttling valve and the ports which communicate with said reverse conduits, said direction regulating valves and said reverse valves being grouped in pairs within said housing and said groups being synchronized for effecting operation of a plurality of direction regulating valves to open in unison at the same time a plurality of said reverse valves close in unison and vice versa, whereby to control passage of pressure fluid through said fluid conduits and reverse conduits.

3. In combination with actuating means for operating a pair of movable members those improvements which embody a unitary assembly adapted to effect operation and control of said actuating means to move said members in synchronism, said unitary assembly comprising means defining a single housing enclosing the following: a gear divider, a plurality of throttling valves, a plurality of direction regulating valves, and a plurality of reverse valves, said direction regulating valves and said reverse valves being grouped in synchronized pairs within said housing for effecting operation of a plurality of valves in unison, thereby to control passage of pressure fluid to said actuating means whereby said movable members are selectively operated under controlled pressure throughout their movement in either of two directions.

4. In a device of the class described the combination comprising actuating means for operating a plurality of remotely located devices to be operated in synchronism including a source of fluid under pressure and a plurality of fluid motors operating said devices under fluid pressure, and a unitary assembly adapted for dividing, equalizing and diverting said fluid under pressure selectively whereby said motors are operated under controlled pressure throughout their movement in either of two directions, said unitary assembly comprising means defining a single housing enclosing the following: a gear divider means, a plurality of throttling valves, a plurality of direction regulating valves, and a plurality of reverse valves, said direction regulating valves and said reverse valves being grouped in synchronized pairs within said housing for effecting operation of a plurality of valves in unison, thereby to control passage of pressure fluid to said actuating means whereby said movable members are selectively operated under controlled pressure throughout their movement in either of two directions.

HOWARD G. TERBEEK.

REFERENCES CITED

The following references are of record in the file of this patent:

UNITED STATES PATENTS

| Number | Name | Date |
| --- | --- | --- |
| 1,999,834 | Ernst | Apr. 30, 1935 |
| 2,266,921 | Trautman | Dec. 23, 1941 |
| 2,279,693 | Martin | Apr. 14, 1942 |
| 2,291,578 | Johnson | July 28, 1942 |
| 2,301,122 | Kellett | Nov. 3, 1942 |
| 2,311,336 | Gora | Feb. 16, 1943 |
| 2,343,912 | Lauck | Mar. 14, 1944 |
| 2,386,219 | Lauck | Oct. 9, 1945 |
| 2,387,007 | Buchanan | Oct. 16, 1945 |

FOREIGN PATENTS

| Number | Country | Date |
| --- | --- | --- |
| 492,669 | Great Britain | Sept. 23, 1938 |

OTHER REFERENCES

Ser. No. 366,364, Wünsch et al. (A. P. C.) pub. Apr. 27, 1943.